US009655093B2

(12) United States Patent
Chen et al.

(10) Patent No.: US 9,655,093 B2
(45) Date of Patent: May 16, 2017

(54) METHOD FOR CONFIGURING RESOURCES, DEVICE, AND SYSTEM

(71) Applicant: Huawei Technologies Co., Ltd., Shenzhen (CN)

(72) Inventors: Yuhua Chen, Shenzhen (CN); Wei Quan, Shenzhen (CN); Yi Jiang, Shenzhen (CN); Jian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 14/487,889

(22) Filed: Sep. 16, 2014

(65) Prior Publication Data

US 2015/0003391 A1    Jan. 1, 2015

Related U.S. Application Data

(63) Continuation of application No. PCT/CN2012/081438, filed on Sep. 14, 2012.

(30) Foreign Application Priority Data

Mar. 16, 2012 (WO) ................ PCT/CN2012/072439

(51) Int. Cl.
*H04W 4/00* (2009.01)
*H04W 72/04* (2009.01)
(Continued)

(52) U.S. Cl.
CPC ......... *H04W 72/042* (2013.01); *H04L 5/0044* (2013.01); *H04L 5/0078* (2013.01);
(Continued)

(58) Field of Classification Search
None
See application file for complete search history.

(56) References Cited

U.S. PATENT DOCUMENTS

2010/0113058 A1* 5/2010 Wu ...................... H04W 72/02
455/452.1
2011/0164585 A1 7/2011 Yu et al.
(Continued)

FOREIGN PATENT DOCUMENTS

| CN | 101500309 A | 8/2009 |
| CN | 102014480 A | 4/2011 |

(Continued)

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 10). 3GPP TS 36.321. V10.5.0, Mar. 2012, 54 pgs.

*Primary Examiner* — Otis L Thompson, Jr.
(74) *Attorney, Agent, or Firm* — Brinks Gilson & Lione (57) ABSTRACT

Embodiments of the present invention provide a method for configuring resources, a device and a system. The method includes: generating resource configuration information (S201); carrying the resource configuration information in a media access control protocol data unit (MAC PDU) or a physical downlink control channel (PDCCH) signaling and sending to a user equipment, to enable the user equipment to perform uplink transmission according to the resource configuration information (S202). The method for configuring resources, the device and the system provided in the embodiments of the present invention can achieve fast physical layer radio resource configuration with a short delay.

18 Claims, 3 Drawing Sheets

(51) Int. Cl.
*H04L 5/00* (2006.01)
*H04W 72/12* (2009.01)

(52) U.S. Cl.
CPC ....... *H04L 5/0092* (2013.01); *H04W 72/0413* (2013.01); *H04W 72/1289* (2013.01)

(56) References Cited

U.S. PATENT DOCUMENTS

| | | |
|---|---|---|
| 2011/0170497 A1 | 7/2011 | Lin et al. |
| 2011/0199991 A1 | 8/2011 | Harris et al. |
| 2012/0026957 A1 | 2/2012 | Cai et al. |
| 2012/0176991 A1 | 7/2012 | Chen et al. |
| 2012/0176996 A1* | 7/2012 | Kim ................ H04W 72/0413 370/329 |
| 2013/0003678 A1 | 1/2013 | Quan et al. |
| 2013/0083709 A1* | 4/2013 | Ahn ..................... H04L 1/1607 370/280 |
| 2013/0163532 A1* | 6/2013 | Anderson ............ H04W 72/04 370/329 |
| 2013/0182676 A1* | 7/2013 | Lee ..................... H04L 1/0027 370/329 |

FOREIGN PATENT DOCUMENTS

| | | |
|---|---|---|
| CN | 102025466 A | 4/2011 |
| CN | 102106129 A | 6/2011 |
| CN | 102123399 A | 7/2011 |
| CN | 102293043 A | 12/2011 |
| EP | 2166809 A1 | 3/2010 |
| EP | 2182763 A1 | 5/2010 |
| WO | WO 2011/050856 A1 | 5/2011 |
| WO | WO 2011/137408 A2 | 11/2011 |

* cited by examiner

METHOD FOR CONFIGURING RESOURCES, DEVICE, AND SYSTEM

CROSS-REFERENCE TO RELATED APPLICATION

This application is a continuation of International Application No. PCT/CN2012/081438, filed on Sep. 14, 2012, which claims priority to International Application No. PCT/CN2012/072439, filed on Mar. 16, 2012, both of which are hereby incorporated by reference in their entireties.

TECHNICAL FIELD

The present invention relates to the resource configuration technology, and more particularly to, a method for configuring resources, a device and a system, and belongs to the field of communication technology.

BACKGROUND

As smart phones become increasingly popular, some non-traditional services, such as a background service and an instant messaging service featured by a small data packet and a long data packet inter-arrival time are becoming increasingly prevalent.

When such relatively isolated small data packet arrives, a user equipment (0) is usually in a radio resource control protocol (Radio Resource Control, RRC) connection release state (i.e., idle state) or RRC connection setup but out of synchronization state, because there is no data transmission for a long time, and therefore, when there is data to be sent, the UE needs to perform a random access process and complete uplink synchronization first, and then perform data transmission; in order not to repeat the above process every time there is data transmission subsequently, a physical layer radio resource configured by a network side for the UE are usually acquired through an RRC connection setup/reconfiguration process, so as to perform subsequent uplink transmission according to the physical layer radio resource configured by the network side.

It can be seen that, since the physical layer radio resource configured by the network side for the UE to perform uplink transmission are acquired through the RRC connection setup/reconfiguration process, every time the UE performs service data transmission, a long delay is thus caused, and the transmission efficiency is greatly reduced.

SUMMARY

In view of disadvantages present in the prior art, embodiments of the present invention provide a method for configuring resources, a device and a system, so as to achieve fast physical layer radio resource configuration with a short delay.

In a first aspect, there is provided a method for configuring resources, including:
  generating resource configuration information;
  carrying the resource configuration information in a media access control protocol data unit MAC PDU or a physical downlink control channel PDCCH signaling and sending to a user equipment, to enable the user equipment to perform uplink transmission according to the resource configuration information.

In a first possible implementation mode of the first aspect, the resource configuration information is scheduling request SR resource configuration information, uplink pilot signal SRS resource configuration information, or channel quality indicator information CQI resource configuration information.

In a second possible implementation mode of the first aspect, the resource configuration information includes first resource configuration information and second resource configuration information;
  correspondingly, carrying the resource configuration information in the MAC PDU and sending to the user equipment, further including:
  sending the first resource configuration information to the user equipment in advance through a radio resource control protocol RRC message, or presetting the first resource configuration information in the user equipment;
  the carrying the resource configuration information in the MAC PDU or the PDCCH signaling and sending to the user equipment, specifically includes:
  carrying the second resource configuration information in the MAC PDU or the PDCCH signaling and sending to the user equipment.

In a third possible implementation mode according to the second possible implementation mode of the first aspect, the first resource configuration information and the second resource configuration information include configuration information of different parameters related to the physical layer radio resource used for performing uplink transmission by the user equipment.

In a fourth possible implementation mode according to the second possible implementation mode of the first aspect, the first resource configuration information includes parameter information related to the physical layer radio resource used for performing uplink transmission by the user equipment; the second resource configuration information includes activation information or deactivation information for setting availability of the physical layer radio resource used for performing uplink transmission by the user equipment.

In a fifth possible implementation mode according to the first aspect or any of the first to fourth possible implementation modes of the first aspect, before generating the resource configuration information, further include:
  receiving a time information report sent by the user equipment;
  determining to generate the resource configuration information according to the time information report.

In a sixth possible implementation mode according to any of the first to fourth possible implementation modes of the first aspect, the SR resource configuration information includes an SR resource period, a subframe in the SR resource period allocated for the user equipment, and a physical uplink control channel PUCCH resource for bearing the SR; the SRS resource configuration information includes an SRS resource period, a subframe in the SRS resource period allocated for the user equipment, and an SRS channel resource for bearing the SRS; and the CQI resource configuration information includes a CQI resource period, a subframe in the CQI resource period allocated for the user equipment, and a PUCCH resource for bearing the CQI.

In a seventh possible implementation mode according to the sixth possible implementation mode of the first aspect, the SR resource configuration information further includes a valid period or a number of valid times of the SR resource; the SRS resource configuration information further includes a valid period or a number of valid times of the SRS resource; the CQI resource configuration information further includes a valid period or a number of valid times of the CQI resource.

In an eighth possible implementation mode according to the first aspect or any of the first to fourth possible implementation modes of the first aspect, the generating the resource configuration information specifically includes:

selecting, from a preset range of physical layer radio resources, a resource used for performing uplink transmission by the user equipment and configured for the user equipment, where each physical layer radio resource within the preset range has a unique identification code, and the unique identification code is less than or equal to a quantity of resources of a corresponding resource type in the preset range of the physical layer radio resources;

the carrying the resource configuration information in the MAC PDU or the PDCCH signaling, specifically includes:

carrying an identification code corresponding to the resource configured for the user equipment in the MAC PDU or the PDCCH signaling.

In an ninth possible implementation mode according to the eight possible implementation mode of the first aspect, before carrying the resource configuration information in the MAC PDU or the PDCCH signaling, further include:

sending the preset range of the physical layer radio resources to the user equipment in advance through an RRC message, or presetting the physical layer radio resources in the user equipment.

In a second aspect, there is provided a method for configuring resources, including:

receiving a media access control protocol data unit MAC PDU or a physical downlink control channel PDCCH signaling sent by a network side, where the MAC PDU or the PDCCH signaling carries third resource configuration information;

parsing the MAC PDU or the PDCCH signaling to acquire the third resource configuration information, and acquiring a physical layer radio resource used for performing uplink transmission according to the third resource configuration information.

In a first possible implementation mode of the second aspect, the physical layer radio resource used for performing uplink transmission includes: an SR resource for performing SR uplink transmission, an SRS resource for performing SRS uplink transmission, and/or a CQI resource for performing CQI uplink transmission.

In a second possible implementation mode of the second aspect, before receiving the MAC PDU or the PDCCH signaling sent by the network side, the method further includes:

acquiring fourth resource configuration information by receiving and parsing an RRC message sent by the network side, or acquiring the fourth resource configuration information which is preset;

correspondingly, the acquiring the physical layer radio resource used for performing uplink transmission according to the third resource configuration information, specifically includes:

acquiring the physical layer radio resource used for performing uplink transmission according to the fourth resource configuration information and the third resource configuration information.

In a third possible implementation mode according to the second possible implementation mode of the second aspect, the fourth resource configuration information and the third resource configuration information include configuration information of different parameters related to the physical layer radio resource for performing uplink transmission;

correspondingly, the acquiring the physical layer radio resource used for performing uplink transmission according to the fourth resource configuration information and the third resource configuration information specifically includes:

synthesizing the configuration information of the different parameters related to the physical layer radio resource used for performing uplink transmission included in the fourth resource configuration information and the third resource configuration information and acquiring the physical layer radio resource used for performing uplink transmission.

In a fourth possible implementation mode according to the second possible implementation mode of the second aspect, the fourth resource configuration information includes parameter information related to the physical layer radio resource used for performing uplink transmission; the third resource configuration information includes activation information or deactivation information for setting availability of the physical layer radio resource used for performing uplink transmission;

correspondingly, the acquiring the physical layer radio resource used for performing uplink transmission according to the fourth resource configuration information and the third resource configuration information specifically includes:

determining the physical layer radio resource used for performing uplink transmission according to the fourth resource configuration information, and activating or deactivating the physical layer radio resource used for performing uplink transmission according to the third resource configuration information; if the physical layer radio resource used for performing uplink transmission is activated, then being able to use the physical layer radio resource used for performing uplink transmission; if the physical layer radio resource used for performing uplink transmission is deactivated, then stopping using the physical layer radio resource used for performing uplink transmission.

In a fifth possible implementation mode according to the second aspect or any of the first to fourth possible implementation modes of the second aspect, before receiving the MAC PDU or the PDCCH signaling sent by the network side, further include:

sending a time information report to the network side according to uplink data to be sent, to enable the network side to determine to generate the third resource configuration information according to the time information report.

In a sixth possible implementation mode according to the second aspect or any of the first to fourth possible implementations of the second aspect, the third resource configuration information includes: an SR resource period, a subframe in the SR resource period allocated for the user equipment, and a physical uplink control channel PUCCH resource for bearing the SR; and/or includes: an SRS resource period, a subframe in the SRS resource period allocated for the user equipment, and an SRS channel resource for bearing the SRS; and/or includes: a CQI resource period, a subframe in the CQI resource period allocated for the user equipment, and a PUCCH resource for bearing the CQI.

In a seventh possible implementation mode of the second aspect, further include:

releasing the physical layer radio resource used for performing uplink transmission, if it is determined that a preset condition is satisfied.

In an eighth possible implementation mode according to the seventh possible implementation mode of the second aspect, the third resource configuration information further includes a valid period or a number of valid times of the physical layer radio resource used for performing uplink transmission;

correspondingly, the releasing the physical layer radio resource used for performing uplink transmission, if it is determined that the preset condition is satisfied, specifically includes:

releasing the physical layer radio resource used for performing uplink transmission, if it is determined that a time adjustment timer TAT expires, or the valid period or the number of valid times is exceeded.

In a ninth possible implementation mode according to the fourth possible implementation mode of the second aspect, the method further includes:

deactivating the physical layer radio resource used for performing uplink transmission, if the TAT expires.

In a tenth possible implementation mode according to the second aspect or any of the first to the fourth possible implementation modes of the second aspect, the third resource configuration information is resource configuration information generated by the network side according to a preset range of physical layer radio resources, where each physical layer radio resources within the preset range has a unique identification code, and the unique identification code is less than or equal to a quantity of resources of a corresponding resource type in the preset range of the physical layer radio resources;

correspondingly, the parsing the MAC PDU or the PDCCH signaling to acquire the third resource configuration information, and the acquiring physical layer radio resource used for performing uplink transmission according to the third resource configuration information, specifically include:

parsing out the identification code carried in the MAC PDU or the PDCCH signaling, and determining the physical layer radio resource used for performing uplink transmission according to the identification code carried in the MAC PDU or the PDCCH signaling.

In a third aspect, there is provided a network device, including a resource configuring module and a first sending module coupled to each other, where:

the resource configuring module is configured to generate resource configuration information, and provide to the first sending module;

the first sending module is configured to carry the resource configuration information in an MAC PDU or a PDCCH signaling and send to a user equipment, to enable the user equipment to perform uplink transmission according to the resource configuration information.

In a first possible implementation mode of the third aspect, the resource configuration information is scheduling request SR resource configuration information, uplink pilot signal SRS resource configuration information, or channel quality indicator information CQI resource configuration information.

In a second possible implementation mode of the third aspect, the resource configuration information includes first resource configuration information and second resource configuration information;

correspondingly, the first sending module is configured to send, before carrying the resource configuration information in the MAC PDU and sending to the user equipment, the first resource configuration information to the user equipment in advance through an RRC message; and carry the second resource configuration information in the MAC PDU or the PDCCH signaling and send to the user equipment.

In a third possible implementation mode according to the second possible implementation mode of the third aspect, the first resource configuration information and the second resource configuration information include configuration information of different parameters related to the physical layer radio resource for performing uplink transmission by the user equipment.

In a fourth possible implementation mode according to the second possible implementation mode of the third aspect, the first resource configuration information includes parameter information related to the physical layer radio resource used for performing uplink transmission by the user equipment; the second resource configuration information includes activation information or deactivation information for setting availability of the physical layer radio resource used for performing uplink transmission by the user equipment.

In a fifth possible implementation mode according to the third aspect or any of the first to fourth possible implementation modes of the third aspect, further include:

a first receiving module, coupled to the resource configuring module, and configured to receive a time information report sent by the user equipment;

correspondingly, the resource configuring module is configured to generate the resource configuration information according to the time information report.

In a sixth possible implementation mode according to any of the first to fourth possible implementation modes of the third aspect, the SR resource configuration information includes an SR resource period, a subframe in the SR resource period allocated for the user equipment, and a physical uplink control channel PUCCH resource for bearing the SR; the SRS resource configuration information includes an SRS resource period, a subframe in the SRS resource period allocated for the user equipment, and an SRS channel resource for bearing the SRS; and the CQI resource configuration information includes a CQI resource period, a subframe in the CQI resource period allocated for the user equipment, and a PUCCH resource for bearing the CQI.

In a seventh possible implementation mode according to the sixth possible implementation modes of the third aspect, the SR resource configuration information further includes a valid period or a number of valid times of the SR resources; the SRS resource configuration information further includes a valid period or a number of valid times of the SRS resources; the CQI resource configuration information further includes a valid period or a number of valid times of the CQI resources.

In an eighth possible implementation mode according to the third aspect or any of the first to fourth possible implementation modes of the third aspect, the resource configuration module is specifically configured to select from a preset range of physical layer radio resources a resource used for performing uplink transmission by the user equipment, where each physical layer radio resource within the preset range has a unique identification code, and the unique identification code is less than or equal to a quantity of resources of a corresponding resource type in the preset range of the physical layer radio resources;

correspondingly, the first sending module is specifically configured to carry an identification code corresponding to a scheduling request resource configured for the user equipment, in the MAC PDU or the PDCCH signaling.

In a ninth possible implementation mode according to the eighth possible implementation mode of the third aspect, the first sending module is further configured to send the preset range of the physical layer radio resources to the user equipment in advance through an RRC message.

In a fourth aspect, there is provided a user equipment, including a second receiving module and a resource acquiring module coupled to each other, where:

the second receiving module is configured to receive an MAC PDU or a PDCCH signaling sent by the network side, and provide to the resource acquiring module, where the MAC PDU or the PDCCH signaling carries third resource configuration information;

the resource acquiring module is configured to parse the MAC PDU or the PDCCH signaling to acquire the third resource configuration information, and acquire a physical layer radio resource used for performing uplink transmission according to the third resource configuration information.

In a first possible implementation mode of the fourth aspect, the physical layer radio resource used for performing uplink transmission includes: an SR resource for performing SR uplink transmission, an SRS resource for performing SRS uplink transmission, and/or a CQI resource for performing CQI uplink transmission.

In a second possible implementation mode of the fourth aspect, the second receiving module is further configured to acquire fourth resource configuration information by receiving and parsing an RRC message sent by the network side, or acquiring fourth resource configuration information which is preset;

correspondingly, the resource acquiring module is configured to acquire the physical layer radio resource used for performing uplink transmission according to the fourth resource configuration information and the third resource configuration information.

In a third possible implementation mode according to the second possible implementation mode of the fourth aspect, the fourth resource configuration information and the third resource configuration information include configuration information of different parameters related to the physical layer radio resource used for performing uplink transmission;

correspondingly, the resource acquiring module is configured to synthesize the configuration information of the different parameters related to the physical layer radio resource used for performing uplink transmission included in the fourth resource configuration information and the third resource configuration information and acquire the physical layer radio resource used for performing uplink transmission.

In a fourth possible implementation mode according to the third possible implementation mode of the fourth aspect, the fourth resource configuration information includes parameter information related to the physical layer radio resource used for performing uplink transmission; the third resource configuration information includes activation information or deactivation information for setting availability of the physical layer radio resource used for performing uplink transmission;

correspondingly, the resource acquiring module is specifically configured to determine the physical layer radio resource used for performing uplink transmission according to the fourth resource configuration information, and activate or deactivate the physical layer radio resource used for performing uplink transmission according to the third resource configuration information; if the physical layer radio resource used for performing uplink transmission is activated, then acquire the physical layer radio resource used for performing uplink transmission; if the physical layer radio resource used for performing uplink transmission is deactivated, then stop using the physical layer radio resource used for performing uplink transmission.

In a fifth possible implementation mode according to the fourth aspect or any of the first to fourth possible implementation modes of the fourth aspect, further include:

a second sending module, configured to send a time information report to the network side according to uplink data to be sent, to enable the network side to determine to generate the third resource configuration information according to the time information report.

In a sixth possible implementation mode according to the fourth aspect or any of the first to fourth possible implementation modes of the fourth aspect, the third resource configuration information includes: an SR resource period, a subframe in the SR resource period allocated for the user equipment, and a physical uplink control channel PUCCH resource for bearing the SR; and/or includes: an SRS resource period, a subframe in the SRS resource period allocated for the user equipment, and an SRS channel resource for bearing the SRS; and/or includes: a CQI resource period, a subframe in the CQI resource period allocated for the user equipment, and a PUCCH resource for bearing the CQI.

In a seventh possible implementation mode of the fourth aspect, further include:

a resource releasing module, configured to release the physical layer radio resource used for performing uplink transmission, if it is determined that a preset condition is satisfied.

In an eighth possible implementation mode according to the seventh possible implementation mode of the fourth aspect, the third resource configuration information further includes a valid period or a number of valid times of the physical layer radio resource used for performing uplink transmission;

correspondingly, the resource releasing module is specifically configured to release the physical layer radio resource used for performing uplink transmission, if it is determined that a TAT expires, or the valid period or the number of valid times is exceeded.

In a ninth possible implementation mode according to the fourth possible implementation mode of the fourth aspect, the resource acquiring module is further configured to deactivate the physical layer radio resource used for performing uplink transmission, if the TAT expires.

In a tenth possible implementation mode according to the fourth aspect or any of the first to the fourth possible implementation modes of the fourth aspect, the third resource configuration information is resource configuration information generated by the network side according to a preset range of physical layer radio resources, where each physical layer radio resource within the preset range has a unique identification code, the unique identification code is less than or equal to a quantity of resources of a corresponding resource type in the preset range of the physical layer radio resources;

correspondingly, the resource acquiring module is specifically configured to parse out the identification code carried in the MAC PDU or the PDCCH signaling, and determine the physical layer radio resource used for performing uplink transmission according to the identification code carried in the MAC PDU or the PDCCH signaling.

In a fifth aspect, there is provided a communication system, including a user equipment according to any one of the embodiments of the present invention, and a network device according to any one of the embodiments of the present invention.

In the method for configuring resources, the device and the system according to the embodiment of the present invention, the eNB carries the resource configuration information in the MAC PDU or the PDCCH signaling after configuring the physical layer radio resource and generating resource configuration information for the UE, and sends the MAC PDU or the PDCCH signaling to the UE, to enable the UE to acquire the physical layer radio resource used for performing uplink transmission by processing the MAC PDU or the PDCCH signaling. Since the eNB and the UE can complete the MAC PDU or the PDCCH signaling processing using the MAC layer and the physical layer, or only using the physical layer, there is no need to occupy the RRC signaling, and therefore, signaling consumption is low, processing efficiency is high and delay is short, and the configuration efficiency for the physical layer radio resources is improved greatly.

BRIEF DESCRIPTION OF DRAWINGS

In order to illustrate the technical solutions in embodiments of the present invention more clearly, accompanying drawings needed in the embodiments are illustrated briefly as follows. Apparently, the accompanying drawings are merely part of embodiments of the invention, and persons skilled in the art can derive other drawings from them without creative efforts.

DESCRIPTION OF EMBODIMENTS

The technical solutions in the embodiments of the present invention are hereinafter described clearly with reference to the accompanying drawings in the embodiments of the present invention. Obviously, the embodiments described here are part of the embodiments of the invention and not all of the embodiments. All other embodiments, which can be derived by persons skilled in the art from the embodiments given herein without creative efforts, shall fall within the protection scope of the present invention.

Technical solutions of the embodiments of the present invention can be applied to any network system, and a long term evolution (Long Time Evolution, LTE) network will be described hereinafter as an example to illustrate the embodiments of the present invention.

Embodiment 1

Figure 1:
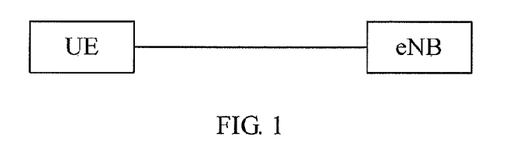
FIG. 1 is a system architectural diagram of a typical LTE network.

FIG. 1 is a system architectural diagram of a typical LTE network. As shown in FIG. 1, a UE and a network side are included, where the network side includes, for example, an evolved Node B (e-NodeB, eNB for short hereinafter). The method for configuring resources according to Embodiment 1 of the present invention is performed by the network side, such as an eNB.

Figure 2:
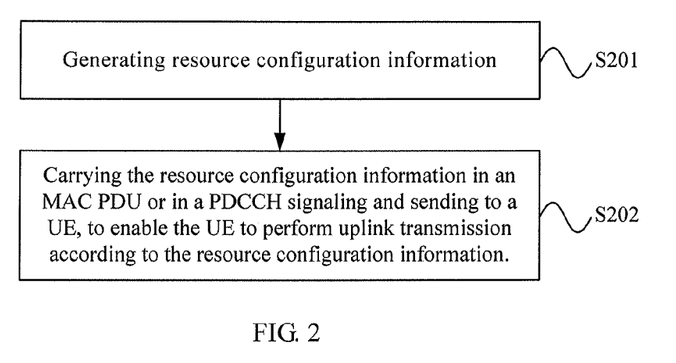
FIG. 2 is a schematic flowchart of a method for configuring resources according to an embodiment of the present invention.

FIG. 2 is a schematic flowchart of a method for configuring resources according to an embodiment of the present invention. As shown in FIG. 2, the method for configuring resources includes steps as follows:

Step S201, Generating resource configuration information;

Step S202, Carrying the resource configuration information in a media access control (Media Access Control, MAC) protocol data unit (Protocol Data Unit, PDU) or in a physical downlink control channel (PDCCH) signaling and sending to a UE, to enable the UE to perform uplink transmission according to the resource configuration information.

Specifically, in the method for configuring resources according to this embodiment, the eNB can allocate a physical layer radio resource for performing uplink transmission and generate resource configuration information for the UE by an arbitrary rule or manner; and moreover, different physical layer radio resources can be allocated for different uplink information sent by the UE, the embodiment does not limit it.

Figure 3:
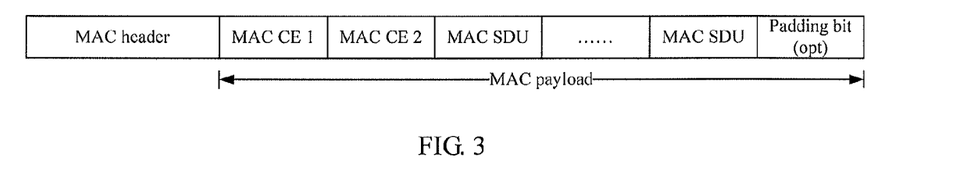
FIG. 3 is a schematic structural diagram of a typical MAC PDU.

In the LTE system, the interface between the eNB and the UE is a Uu interface, an MAC layer of the eNB generates an MAC PDU according to the resource configuration information and then sends the MAC PDU to a physical layer, and then the MAC PDU is processed by the physical layer and then sent to the UE through the Uu interface. FIG. 3 is a schematic structural diagram of a typical MAC PDU. As shown in FIG. 3, one MAC PDU includes an MAC header (MAC header) and an MAC payload (MAC payload), where the MAC payload includes an MAC service data unit (Service Data Unit, SDU), an MAC control element (Control Element, CE) and an optional (opt) padding bit (padding). The MAC layer of the eNB can carry resource configuration information in the MAC PDU, for example, by writing the resource configuration information in an MAC CE field. The resource configuration information can be expressed in the MAC CE in an arbitrary manner, for example, following the current manner of expression in the RRC message, and this embodiment is not limited thereto.

After receiving the MAC PDU containing the resource configuration information, the UE acquires the MAC CE from the received MAC PDU, and determines the corresponding physical layer radio resource according to the information carried in the MAC CE.

Carrying the resource configuration information in the MAC PDU is taken as an example for illustration in the above, similarly, the eNB also can carry the resource configuration information in the PDCCH signaling, and the specific carrying format can be set as required, and this embodiment is not limited thereto.

In the method for configuring resources according to this embodiment, the eNB carries the resource configuration information in the MAC PDU or the PDCCH signaling after configuring resources and generating resource configuration information for the UE, and sends the MAC PDU or the PDCCH signaling to the UE, to enable the UE to perform corresponding uplink transmission by processing the MAC PDU or the PDCCH signaling. Since the eNB and the UE can complete the MAC PDU or the PDCCH signaling processing using the MAC layer and the physical layer, or only using the physical layer, there is no need to occupy the RRC signaling, and therefore, signaling consumption is low, processing efficiency is high and delay is short, and the configuration efficiency for the physical layer radio resources is improved greatly.

Further, in the method for configuring resources in the above embodiment, the resource configuration information is scheduling request (Scheduling Request, SR) resource configuration information, uplink pilot signal (SRS) resource configuration information, or channel quality indicator information (CQI) resource configuration information. Illustrations will be made in detail hereinafter with respect to the three kinds of resource configuration information respectively.

I. SR Resource Configuration Information

SR is information sent by a UE in uplink to request an uplink transmission resource. In order to make sure the UE sends the scheduling request on a suitable and available resource, the eNB needs to perform configuration for uplink scheduling request for the UE in advance, so as to allocate a currently available scheduling request resource to the UE for sending the scheduling request, and notify the UE of a configuration result for the scheduling request (i.e., resource configuration information). In this way, when there is a need to perform data transmission, the UE can determine its own scheduling request resource allocated by the eNB, according to the configuration result, so as to send an uplink scheduling request with the allocated scheduling request resource. In the method for configuring resources according to this embodiment, the eNB can allocate a scheduling request resource and generate resource configuration information for the UE by an arbitrary rule or manner, and the embodiments of the present invention are not limited thereto.

More specifically, for example, the resource configuration information carried in the MAC CE can be: a scheduling request resource period, a subframe in the scheduling request resource period allocated for the user equipment, and a physical uplink control channel (PUCCH) resource for bearing the scheduling request. Particularly, the scheduling request resource period is a cycle period available for the UE to transmit the SR, which is determined by the eNB according to service status of UEs within the cell; the subframe in the scheduling request resource period is an uplink subframe available for the UE to transmit the SR within the period, that is, a specific location of the SR in one period; the PUCCH is for the UE to transmit the scheduling request on the uplink, that is, to notify the UE which PUCCH is used to transmit the scheduling request, such as a time, a frequency and a code resource, by configuring for UE the PUCCH resource for bearing the scheduling request.

The resource configuration information can be expressed in the MAC CE, for example, following the current manner of expression in the RRC message, that is:

The SR-ConfigIndex: i.e. periodicity and offset [0_157]:8 bit

SR-PUCCH-ResourceIndex [0-2047]: 11 bit

That is, if there are 158 combinations of the scheduling request resource period and the subframe in the corresponding period in total (for example, period 10 and subframe 0 is one combination), a possible range is [0, 157], a possible range of PUCCH is [0, 2047], then in the MAC CE, 8 bits (bit) can be used to identify the scheduling request resource period and the subframe in the scheduling request resource period allocated for the UE, 11 bits can be used to identify the PUCCH for bearing the scheduling request allocated for the UE.

After the MAC PDU containing the SR resource configuration information is received, the UE acquires the MAC CE from the received MAC PDU, and determines the corresponding SR resource according to the information carried in the MAC CE.

II. SRS Resource Configuration Information

SRS is a sequence transmitted by the UE in uplink, to enable the eNB to detect uplink channel quality by receiving the sequence. Accordingly, in order to realize detection of the uplink channel quality, a network side needs to allocate in advance a physical layer radio resource for the UE to transmit the SRS, i.e., a SRS resource. In this way, the UE can transmit the SRS in uplink according to the SRS resource allocated by the network side, so that the eNB can complete detection of the uplink channel quality, and thus subsequent scheduling can be performed according to the detected uplink channel quality.

More specifically, for example, the resource configuration information carried in the MAC CE can be: an SRS resource period, a subframe in the SRS resource period allocated for the user equipment, and an SRS resource for bearing the SRS, for example, including one or more of a frequency domain position, a bandwidth, an antenna port number, and etc of the SRS. Particularly, the SRS resource period is a cycle period available for the UE to transmit the SRS; the subframe in the SRS resource period is an uplink subframe available for the UE to transmit the SRS within the period, that is, a specific location of the SRS in one period.

The resource configuration information can be expressed in the MAC CE, for example, following the current manner of expression in the RRC message, and no details will be given here.

After receiving the MAC PDU containing the SRS resource configuration information, the UE acquires the MAC CE from the received MAC PDU, and can determine information, such as the SRS resource period, the subframe in the SRS resource period allocated for the user equipment, and the frequency domain position and the bandwidth etc of an SRS channel, according to the information carried in the MAC CE, and the UE can periodically transmit the SRS via the channel and in the designated subframe of the SRS resource period.

III. CQI Resource Configuration Information

CQI is for transmitting downlink channel quality indicator information in uplink after a UE performs detection of downlink channel quality. In order to make the UE be able to effectively report the downlink channel quality, to enable the eNB to successfully acquire the downlink channel quality, the network side needs to allocate in advance a physical layer radio resource for the UE to transmit the CQI in uplink, i.e., a CQI resource. In this way, the UE can transmit the detected downlink channel quality in uplink via the CQI according to the CQI resource allocated by the network side, so that the eNB can the acquire the downlink channel quality by receiving the CQI, and thus perform subsequent scheduling according to the downlink channel quality.

More specifically, for example, the resource configuration information carried in the MAC CE can be: a CQI resource period, a subframe in the CQI resource period allocated for the user equipment, and a PUCCH resource for bearing the CQI. Particularly, the CQI resource period is a cycle period available for the UE to transmit the CQI; the subframe in the CQI resource period is an uplink subframe available for the UE to transmit the CQI within the period, that is, a specific location of the CQI in one period; the PUCCH is for the UE to transmit the CQI in uplink, that is, the UE is notified which PUCCH is used to transmit the CQI, such as a time, a frequency and a code resource, by configuring for the UE the PUCCH resource for bearing the CQI.

The resource configuration information can be expressed in the MAC CE, for example, following the current manner of expression in the RRC message, and no details will be given here.

After receiving the MAC PDU containing the CQI resource configuration information, the UE acquires the MAC CE from the received MAC PDU, and can determine the corresponding CQI resource according to the information carried in the MAC CE.

Carrying the SR resource configuration information/SRS resource configuration information/CQI resource configuration information in the MAC PDU is taken as an example for illustration, similarly, the eNB also can carry the SR resource configuration information/SRS resource configuration information/CQI resource configuration information in the PDCCH signaling, and the specific carrying format can be set as required, and is not limited herein.

Figure 4:
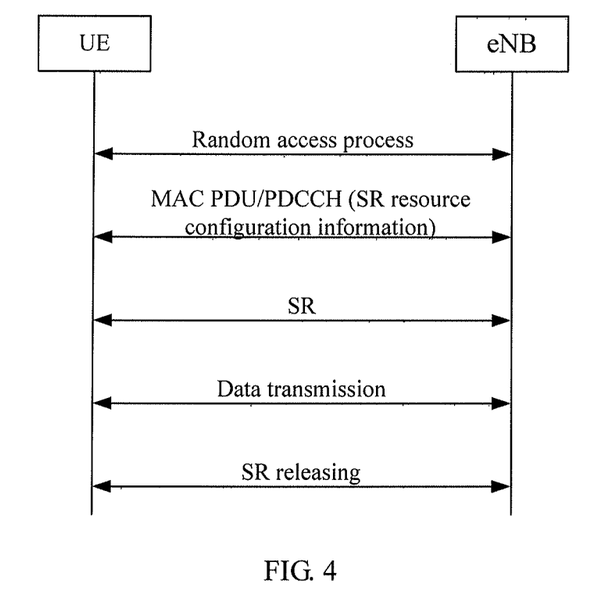
FIG. 4 is a schematic flowchart of performing UE service data transmission with a method for configuring resources according to an embodiment of the present invention.

FIG. 4 is a schematic flowchart of performing UE service data transmission with a method for configuring resources according to an embodiment of the present invention. The SR resource configuration information is taken as an example of the resource configuration information for illustration in FIG. 4. As shown in FIG. 4, the RRC connection with the eNB has been set up currently but in a out of synchronization state, then a random access process is performed to complete uplink synchronization with the eNB; the UE acquires SR resource configuration information allocated by the network side for the UE through the MAC PDU or PDCCH interaction with the eNB; when the UE has one or more data packets to be transmitted in uplink, but without a uplink resource for uplink data transmission, the UE determines a corresponding SR resource according to the SR resource configuration information to transmit the SR in uplink, so as to acquire the uplink resource for uplink data transmission and complete the uplink data transmission. After completion of the data transmission, the UE also can release the SR resource according to a preset releasing rule.

When the UE performs service data transmission, in addition to the SR resource, the physical layer radio resource required by the UE may also include relevant information such as CQI and/or SRS, and the information either can be configured in an existing arbitrary configuration mode, or can be configured quickly with the method for configuring resources according to the embodiments of the present invention.

In the method for configuring resources according to this embodiment, the eNB carries the resource configuration information in the MAC PDU or the PDCCH signaling after configuring resources and generating resource configuration information for the UE, and sends the MAC PDU or the PDCCH signaling to the UE, so that the UE can acquire the physical layer radio resource by processing the MAC PDU or the PDCCH signaling and then perform corresponding uplink transmission. Since the eNB and the UE can complete the MAC PDU or the PDCCH signaling processing using the MAC layer and the physical layer, or only using the physical layer, there is no need to occupy the RRC signaling, and therefore, signaling consumption is low, processing efficiency is high and delay is short, and the configuration efficiency for the resources is improved greatly.

In addition, when the service data transmission of UE is performed using the method for configuring resources according to this embodiment, since physical layer radio resource configuration can be quickly achieved using the MAC PDU or the PDCCH signaling during the process of service data transmission, compared with the current method for acquiring the physical layer radio resource using an RRC reconfiguration procedure, there is no need to process a packet data convergence protocol (PDCP, Packet data convergence protocol) layer and a radio link control (RLC, Radio link Contro) protocol layer, therefore, the required signaling is significantly reduced, delay is shortened, and transmission efficiency of the service data is improved.

Embodiment 2

On the basis of Embodiment 1, the resource configuration information includes first resource configuration information and second resource configuration information;

correspondingly, before carrying the resource configuration information in the MAC PDU and sending to the user equipment, the method further includes:

before carrying the resource configuration information in the MAC PDU and sending to the user equipment, the method further includes:

sending the first resource configuration information to the user equipment in advance through an RRC message, or presetting the first resource configuration information in the user equipment;

the carrying the resource configuration information in the MAC PDU or the PDCCH signaling and sending to the user equipment specifically includes:

setting the second resource configuration information in the MAC PDU or the PDCCH signaling and sending to the user equipment.

In this embodiment, the first resource configuration information and the second resource configuration information being configuration information of different parameters related to the scheduling request resource is taken as an example for illustration.

Specifically, for example, when the resource configuration information includes configuration information of three parameters of a scheduling request resource period, a subframe in the scheduling request resource period allocated for the user equipment, and a PUCCH resource for bearing the scheduling request, the MAC PDU or the PDCCH signaling carries configuration information of only one or two parameters of the three parameters, while the previously interacted RRC message between the eNB and the UE carries configuration information of the remaining parameters, the previously interacted RRC message is, for example, a RRC connection setup message or the RRC reconfiguration message sent by the eNB to the UE when the UE and the eNB sets up the RRC connection for the first time.

More specifically, for example, when the UE and the eNB set up the RRC connection for the first time, the RRC connection setup message or the RRC reconfiguration message sent by the eNB to the UE carries a scheduling request resource period, the UE acquires the scheduling request resource period from the RRC connection setup message or the RRC reconfiguration message, since the UE fails to acquire the remaining information of the SR resources at this time, and then fails to acquire a SR resource, therefore, the scheduling request resource period is stored in the UE only as a parameter, does not occupy a radio resource actually, and thus the parameter of the scheduling request resource period will not be affected when the RRC resource is released.

When the UE needs to send uplink data and acquire configuration information of parameters related to the SR resource except the scheduling request resource period, that is, such as a subframe in the scheduling request resource period and a PUCCH resource for bearing the scheduling request, the UE can combine configuration information of the parameters related to the SR resource acquired from the MAC PDU or the PDCCH signaling with the previously acquired scheduling request resource period to form integrate SR resource configuration information, so as to determine the SR resource, and then transmit the SR in uplink with the determined SR resource.

Although the above process is described by taking the SR resource as an example, persons skilled in the art should appreciate that, the first resource configuration information and the second resource configuration information also can respectively include configuration information of a part of parameters for the SRS resource, or configuration information of a part of parameters for the CQI resource.

In the method for configuring resources in this embodiment, a part of the resource configuration information is allocated to the UE through the RRC message or preset in the UE, and such can reduce the number of bits occupied by the resource configuration information in the MAC PDU or the PDCCH signaling.

Further, in the above embodiment, it can be pre-agreed in a communication protocol between the UE and the eNB that resource configuration is achieved through the MAC PDU or the PDCCH signaling, so as to further reduce the number of bits occupied by the resource configuration information in the MAC PDU or the PDCCH signaling. Hereinafter, the SR resource is taken as an example for illustration. The same rule is also applicable to SRS and CQI.

Specifically, for example, in terms of 2047 PUCCH resources, it is agreed in the protocol that only 16 PUCCH resources therein can be configured through the MAC PDU or the PDCCH signaling. Therefore, when the eNB performs scheduling resource configuration for the UE using the method according to the embodiments of the present invention, configuration with respect to the PDCCH resource can only select from the 16 agreed PUCCH resources, therefore, only 4 bits in the MAC PDU or the PDCCH signaling need to be occupied for identifying the selected PDCCH resource, and 7 bits are saved compared with the occupied 11 bits when a configurable resource range is not previously agreed.

Further, the above resource range available for configuration can be previously sent to a user equipment through an RRC message, or preset in the user equipment in any other mode, both of which can reduce the number of bits when configuring by the MAC PDU or the PDCCH.

Embodiment 3

On the basis of Embodiment 1, the resource configuration information includes first resource configuration information and second resource configuration information;

correspondingly, before carrying the resource configuration information in the MAC PDU and sending to the user equipment, the method further includes:

sending the first resource configuration information to the user equipment in advance through a radio resource control protocol RRC message, or presetting the first resource configuration information in the user equipment;

Carrying the resource configuration information in the MAC PDU or the PDCCH signaling and sending to the user equipment, specifically includes:

carrying the second resource configuration information in the MAC PDU or the PDCCH signaling and sending to the user equipment.

This embodiment is described by taking the first resource configuration information including parameter information related to an SR resource, and the second resource configuration information including activation or deactivation information for setting availability of the SR resource as an example. The following process is also applicable to the SRS resource and the CQI resource.

Specifically, for example, the first resource configuration information includes configuration information of three parameters of a scheduling request resource period, a subframe in the scheduling request resource period allocated for the user equipment, and a PUCCH resource for bearing the scheduling request, the configuration information is carried in a previously interacted RRC message between the eNB and the UE and sent to the UE, the RRC message sent by the eNB to the UE is, for example, an RRC connection setup message or an RRC reconfiguration message sent by the eNB to the UE when the UE establishes an RRC connection with the eNB for the first time, or it can be preset in the UE according to a communication protocol between the UE and the eNB, and in an initial state, the SR resource configuration acquired by the UE is in an active state or an inactive state. Particularly, the active state is a state in which the SR resource configuration is valid, that is, the UE can acquire an SR resource using the acquired SR resource configuration, the inactive state is a state in which the SR resource configuration is invalid, in this state, the UE cannot acquire the SR resource using the acquired SR resource configuration, and in the inactive state, the acquired SR resource configuration actually does not occupy a physical layer radio resource, and is stored in the UE only as a configuration parameter.

The second resource configuration information is activation or deactivation information for setting the availability of the scheduling request resource, specifically, the activation/deactivation information can be one bit in the MAC PDU or PDCCH, or can be other indication information occupying one MAC CE field. Taking occupying one bit as an example, the bit is the activation information when it is "1", the UE responds to the activation information and activate the SR resource configuration which is in the inactive state currently, and thus determines the SR resource according to the acquired SR resource configuration; the bit is the deactivation information when it is "0", the UE responds to the deactivation information and deactivates the SR resource configuration which is in the activated state currently, and releases the SR resource to avoid the waste of network resources.

Besides using the second resource configuration information to modify the state of the acquired SR resource configuration, the UE also can deactivate the SR resource configuration when a time adjustment timer (TAT) expires, and thus release the SR resource. Besides, the activation information and the deactivation information also can be carried in any other signaling, for example, the activation information is carried in a random access response sent by the eNB to the UE, so as to indicate the UE to activate the acquired SR resource configuration according to the activation information, and thus acquire the SR resource.

Embodiment 4

On the basis of any of the above embodiments, the resource configuration information further includes a valid period or a number of valid times for the allocated physical layer radio resource. Specifically, for example, the SR resource configuration information further includes a valid period or a number of valid times for the SR resource; the SRS resource configuration information further includes a valid period or a number of valid times for the SRS resource;

the CQI resource configuration information further includes a valid period or a number of valid times for the CQI resource.

Particularly, the valid period is a time parameter, usually an integral multiple of the resource period; the number of valid times is the number the valid resource periods, namely, to indicate the resource configuration information is invalid after how many resource periods.

Specifically, the valid period or the number of valid times can be set according to an actual network communication condition or as required, and it is used for, at the UE side, releasing the corresponding resource configuration by the UE when the valid period or the number of valid times arrives, so as to save network resources.

In addition to release the configured physical layer radio resource using the above manner, the physical layer radio resource also can be released in other manners, specifically, for example, when the TAT expires, the UE releases the SR/SRS/CQI resource configuration; or, a separate timer is configured in the UE, and the timer is for timing a duration in which the UE is in a certain state (for example, a state in which the UE does not send data), when the timer expires, the UE releases the SR/SRS/CQI resource configuration automatically.

Embodiment 5

On the basis of any of the above embodiments, before generating the resource configuration information, the method further includes:

receiving a time information report sent by the user equipment;

determining to generate the resource configuration information according to the time information report.

Specifically, due to the transmission characteristic of the separate data packet, after the UE completes the transmission of an uplink data packet, there may be no uplink data packet to be sent in a relatively long period, therefore, the UE does not need the eNB to configure the SR resource for it, and only performs uplink synchronization through a random access process, acquires relevant uplink transmission resources to complete current data packet transmission and then enters a silent period again. However, since being unable to acquire the traffic characteristics of the UE, the eNB will allocate a subsequent SR/SRS/CQI resource for the UE, or the eNB performs another SR/SRS/CQI resource configuration for the activated UE which has acquired the SR/SRS/CQI resource configuration. It can be seen that, such configuration process is obviously redundant, and wastes system resources.

Therefore, in order to further use the system resource more efficiently, the UE can be enabled to report a time information report in the process of random access or uplink data transmission, so as to provide a reference for whether the eNB should configure a physical layer radio resource. For example, the UE reports a prediction of data arrival, for providing a reference for whether the eNB should configure a SR resource. Specific examples are as follows:

Step 1, A UE in an out of synchronization state in uplink or in an RRC idle state, which needs to perform uplink data transmission, initiates a random access process, and requests to acquire uplink synchronization and an uplink transmission resource. Moreover, the UE acquires an arrival time of a next uplink data packet from its application layer, and reports the time information to the eNB, specifically, the time information report can be carried in an MAC CE of an MAC PDU to be sent; the MAC CE can be an existing MAC CE, by adding a new field to indicate the time information report, or by using a reserved field therein to indicate the time information report; or can be a newly-designed MAC CE for carrying the time information report.

Step 2, When receiving the time information report sent by the UE, the eNB determines whether to configure/activate SR information for the UE with reference to the information. Specifically, if a time value sent by the UE is greater than or equal to a timing advance timer (TA Timer), then there is no need to configure/activate the SR information for the UE; while if the time value sent by the UE is less than the TA timer, then there is a need to configure/activate the SR information for it.

The processing manner for the SRS/CQI resource configuration is similar to the SR resource configuration information, and no details will be given here.

Embodiment 6

The method for configuring resources in this embodiment is performed by the UE.

Figure 5:
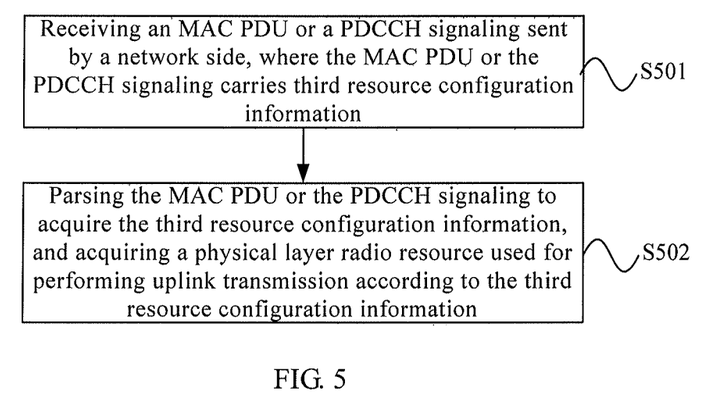
FIG. 5 is a schematic flowchart of a method for configuring resources according to another embodiment of the present invention.

FIG. 5 is a schematic flowchart of a method for configuring resources according to another embodiment of the present invention. As shown in FIG. 5, the method for configuring resources includes steps as follows:

Step S501, Receiving an MAC PDU or a PDCCH signaling sent by a network side, where the MAC PDU or the PDCCH signaling carries third resource configuration information;

Step S502, Parsing the MAC PDU or the PDCCH signaling to acquire the third resource configuration information, and acquiring a physical layer radio resource used for performing uplink transmission according to the third resource configuration information.

Particularly, the MAC PDU or the PDCCH signaling received by the UE from the network side (such as an eNB), for example, can be an MAC PDU or a PDCCH signaling which carries the resource configuration information and which is configured by the eNB according to the method in any of Embodiment 1 to Embodiment 5, and the specific procedure is not repeated here any further. Further, the third resource configuration information can be all or a part of the resource configuration information required by the UE to acquire the physical layer radio resource (such as the SR/SRS/CQI resource) used for performing uplink transmission, which is not limited herein.

After receiving the MAC PDU or the PDCCH signaling containing configuration information of the physical layer radio resource used for performing uplink transmission, the UE acquires the resource configuration information from the received MAC PDU or PDCCH signaling, and then a corresponding physical layer radio resource for uplink transmission can be determined.

In the method for configuring resources according to this embodiment, the eNB carries the resource configuration information via the MAC PDU or the PDCCH signaling after configuring a resource and generating resource configuration information for the UE, and sends the MAC PDU or the PDCCH signaling to the UE, so that the UE can acquire the physical layer radio resource used for performing uplink transmission by processing the MAC PDU or the PDCCH signaling. Since the eNB and the UE can complete the processing on the MAC PDU or the PDCCH signaling using the MAC layer and the physical layer, or only using the physical layer, there is no need to occupy, and therefore, signaling consumption is low, processing efficiency is high and delay is short, and the configuration efficiency for the physical layer radio resource is improved greatly.

In addition, when the service data transmission of UE is performed with the method for configuring resources according to this embodiment, since the physical layer radio resource configuration can be quickly achieved using the MAC PDU or the PDCCH signaling during the process of the service data transmission, compared with the current method of acquiring a physical layer radio resource with an RRC reconfiguration procedure, there is no need to process PDCH protocol layer or RLC protocol layer, therefore, the required signaling is significantly reduced, delay is shortened, and transmission efficiency of the service data is improved.

Further, the physical layer radio resource used for performing uplink transmission include: an SR resource for performing SR uplink transmission, an SRS resource for performing SRS uplink transmission, and/or a CQI resource for performing CQI uplink transmission.

Further, before receiving the MAC PDU or the PDCCH signaling sent by the network side, the method further includes:

acquiring fourth resource configuration information by receiving and parsing an RRC message sent by the network side, or acquiring the fourth resource configuration information which is preset;

correspondingly, the acquiring the physical layer radio resource used for performing uplink transmission according to the third resource configuration information, specifically includes:

acquiring the physical layer radio resource used for performing uplink transmission according to the fourth resource configuration information and the third resource configuration information.

The fourth resource configuration information and the third resource configuration information include configuration information of different parameters related to physical layer radio resource used for performing uplink transmission;

correspondingly, the acquiring the physical layer radio resource used for performing uplink transmission according to the fourth resource configuration information and the third resource configuration information specifically includes:

synthesizing the configuration information of the different parameters related to the physical layer radio resource used for performing uplink transmission included in the fourth resource configuration information and the third resource configuration information and acquiring the physical layer radio resource used for performing uplink transmission.

In this case, the specific procedure for the UE is the same with that for the UE in Embodiment 2, and is not repeated here any further.

In addition, it can also be the case that:

The fourth resource configuration information includes parameter information related to the physical layer radio resource used for performing uplink transmission; the third resource configuration information includes activation information or deactivation information used for setting availability of the physical layer radio resource used for performing uplink transmission;

correspondingly, the acquiring the physical layer radio resource used for performing uplink transmission according to the fourth resource configuration information and the third resource configuration information specifically includes:

determining the physical layer radio resource used for performing uplink transmission according to the fourth resource configuration information, and activating or deactivating the physical layer radio resource used for performing uplink transmission according to the third resource configuration information; if the physical layer radio resource used for performing uplink transmission is activated, then acquiring the physical layer radio resource used for performing uplink transmission.

In this case, the specific procedure for the UE is the same with that for the UE in Embodiment 3, and is not repeated here any further.

Further, before receiving the MAC PDU or the PDCCH signaling sent by the network side, further include:

sending a time information report to the network side according to uplink data to be sent, to enable the network side to determine to generate the third resource configuration information according to the time information report.

Further, the third resource configuration information includes: an SR resource period, a subframe in the SR resource period allocated for the user equipment, and a physical uplink control channel PUCCH resource for bearing the SR; and/or includes: an SRS resource period, and a subframe in the SRS resource period allocated for the user equipment; and/or includes: a CQI resource period, a subframe in the CQI resource period allocated for the user equipment, and a PUCCH resource for bearing the CQI.

Further, also include:

releasing the physical layer radio resource used for performing uplink transmission, if it is determined that a preset condition is satisfied.

Further, the third resource configuration information further includes a valid period or a number of valid times of the physical layer radio resource used for performing uplink transmission;

correspondingly, the releasing the physical layer radio resource used for performing uplink transmission, if it is determined that the preset condition is satisfied, specifically includes:

releasing the physical layer radio resource used for performing uplink transmission, if it is determined that a time adjustment timer TAT expires, or the valid period or the number of valid times is exceeded.

Further, also include:

deactivating the physical layer radio resource used for performing uplink transmission, if the TAT expires.

Further, the third resource configuration information is resource configuration information generated by the network side according to a preset range of physical layer radio resources, where each physical layer radio resources within the preset range has a unique identification code, the unique identification code is less than or equal to the quantity of resources of a corresponding resource type in the preset range of the physical layer radio resources;

correspondingly, the parsing the MAC PDU or the PDCCH signaling to acquire the third resource configuration information, and acquiring the physical layer radio resource used for performing uplink transmission according to the third resource configuration information, specifically include:

parsing out an identification code carried in the MAC PDU or the PDCCH signaling, and determining the physical layer radio resource used for performing uplink transmission according to the identification code carried in the MAC PDU or the PDCCH signaling.

Embodiment 7

The network device in the embodiment of the present invention is an eNB which executes the method for configuring resources in the above embodiments.

Figure 6:
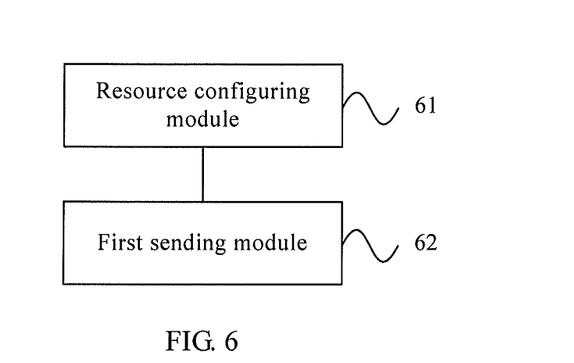
FIG. 6 is a schematic structural diagram of a network device according to an embodiment of the present invention.

FIG. 6 is a schematic structural diagram of a network device according to an embodiment of the present invention. As shown in FIG. 6, the network device includes a resource configuring module 61 and a first sending module 62 coupled to each other, where:

the resource configuring module 61 is configured to generate resource configuration information, and provide it to the first sending module 62;

the first sending module 62 is configured to carry the resource configuration information in an MAC PDU or a PDCCH signaling and send to a user equipment, to enable the user equipment to perform uplink transmission according to the resource configuration information.

The procedure for the network device to perform resource configuration in this embodiment is the same with the method for configuring resources in the foregoing embodiments, and thus is not repeated here any further.

Particularly, the resource configuring module can be realized, such as through a processor, and the first sending module can be realized, such as through a transmitter.

In the network device according to this embodiment, after a resource is configured and resource configuration information is generated for the UE, the resource configuration information is carried in the MAC PDU or the PDCCH signaling, and then the MAC PDU or the PDCCH signaling is sent to the UE, to enable the UE to perform corresponding uplink transmission by processing the MAC PDU or the PDCCH signaling. Since the eNB and the UE can complete the processing of the MAC PDU or the PDCCH signaling using the MAC layer and the physical layer, or only using the physical layer, there is no need to occupy the RRC signaling, and therefore, signaling consumption is low, processing efficiency is high and delay is short, and the configuration efficiency for the physical layer radio resources is improved greatly.

Further, in the network device of the above embodiment, the resource configuration information is scheduling request SR resource configuration information, uplink pilot signal SRS resource configuration information, or channel quality indicator information CQI resource configuration information.

Further, in the network device of the above embodiment, the resource configuration information includes first resource configuration information and second resource configuration information;

correspondingly, the first sending module is further configured to send, before carrying the resource configuration information in the MAC PDU and sending to the user equipment, the first resource configuration information to the user equipment in advance through an RRC message;

and carry the second resource configuration information in the MAC PDU or the PDCCH signaling to send to the user equipment.

Further, in the network device of the above embodiment, the first resource configuration information and the second resource configuration information include configuration information of different parameters related to the physical layer radio resource used by the user equipment for performing uplink transmission.

Further, in the network device of the above embodiment, the first resource configuration information includes parameter information related to the physical layer radio resource used by the user equipment for performing uplink transmission; the second resource configuration information includes activation information or deactivation information used for setting availability of the physical layer radio resource used by the user equipment for performing uplink transmission.

Further, the network device in the above embodiment further includes:

a first receiving module, coupled to the resource configuring module, and configured to receive a time information report sent by the user equipment;

correspondingly, the resource configuring module is configured to generate the resource configuration information according to the time information report.

Further, in the network device of the above embodiment the SR resource configuration information includes an SR resource period, a subframe in the SR resource period allocated for the user equipment, and a physical uplink control channel PUCCH resource for bearing the SR; the SRS resource configuration information includes an SRS resource period, a subframe in the SRS resource period allocated for the user equipment, and an SRS channel resource for bearing the SRS; and the CQI resource configuration information includes a CQI resource period, a subframe in the CQI resource period allocated for the user equipment, and a PUCCH resource for bearing the CQI.

Further, in the network device of the above embodiment, the SR resource configuration information further includes a valid period or a number of valid times for the SR resource; the SRS resource configuration information further includes a valid period or a number of valid times for the SRS resource; the CQI resource configuration information further includes a valid period or a number of valid times for the CQI resource.

Further, in the network device of the above embodiment, the resource configuration information is specifically configured to select, from a preset range of physical layer radio resources, a resource which is used for the user equipment to perform uplink transmission and configured for the user equipment, wherein each physical layer radio resource within the preset range has a unique identification code, and the unique identification code is less than or equal to the quantity of resources of a corresponding resource type in the preset range of the physical layer radio resources;

correspondingly, the first sending module is specifically configured to carry an identification code corresponding to a scheduling request resource configured for the user equipment in the MAC PDU or the PDCCH signaling.

Further, in the network device in the above embodiment, the first sending module is further configured to send the preset range of the physical layer radio resources to the user equipment in advance through an RRC message.

Embodiment 8

Figure 7:
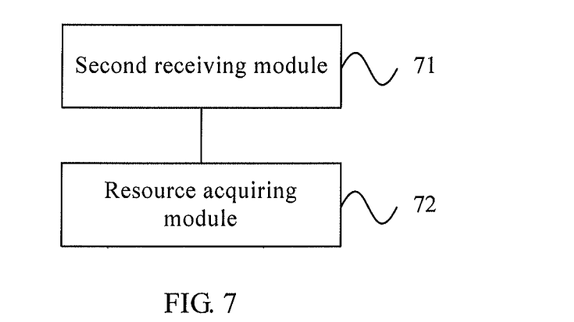
FIG. 7 is a schematic structural diagram of a user equipment according to an embodiment of the present invention.

FIG. 7 is a schematic structural diagram of a user equipment according to an embodiment of the present invention. As shown in FIG. 7, the user equipment includes a second receiving module 71 and a resource acquiring module 72 coupled to each other, where:

the second receiving module 71 is configured to receive an MAC PDU or a PDCCH signaling sent by the network side, and provide it to the resource acquiring module 72, where the MAC PDU or the PDCCH signaling carries third resource configuration information;

the resource acquiring module 72 is configured to parse the MAC PDU or the PDCCH signaling to acquire the third resource configuration information, and acquire a physical layer radio resource used for performing uplink transmission according to the third resource configuration information.

Particularly, the resource configuring module can be realized, such as through a processor, and the first sending module can be realized, such as through a transmitter.

The specific procedure for the UE to perform resource configuration in this embodiment is the same with the method for configuring resources in the foregoing embodiments, and thus is not repeated here any further.

In the user equipment according to this embodiment, the eNB carries the resource configuration information in the MAC PDU or the PDCCH signaling after configuring a resource and generating resource configuration information for the UE, and sends the MAC PDU or the PDCCH signaling to the UE, so that the UE can acquire a physical layer radio resource used for performing uplink transmission by processing the MAC PDU or the PDCCH signaling. Since the eNB and the UE can complete the MAC PDU or the PDCCH signaling processing using the MAC layer and the physical layer, or only using the physical layer, there is no need to occupy and therefore, signaling consumption is low, processing efficiency is high and delay is short, and the configuration efficiency for the physical layer radio resource is improved greatly.

Further, in the user equipment of the above embodiment, the physical layer radio resource used for performing uplink transmission includes: an SR resource used for performing SR uplink transmission, an SRS resource used for performing SRS uplink transmission, and/or a CQI resource used for performing CQI uplink transmission.

Further, in the user equipment of the above embodiment, the second receiving module is further configured to acquire fourth resource configuration information by receiving and parsing an RRC message sent by the network side, or acquire the fourth resource configuration information which is preset;

correspondingly, the resource acquiring module is configured to acquire the physical layer radio resource used for performing uplink transmission according to the fourth resource configuration information and the third resource configuration information.

Further, in the user equipment of the above embodiment, the fourth resource configuration information and the third resource configuration information include configuration information of different parameters related to the physical layer radio resource used for performing uplink transmission;

correspondingly, the resource acquiring module is configured to synthesize the configuration information for the different parameters related to the physical layer radio resource used for performing uplink transmission included in the fourth resource configuration information and the third resource configuration information and acquire the physical layer radio resource used for performing uplink transmission.

Further, in the user equipment of the above embodiment, the fourth resource configuration information includes parameter information related to the physical layer radio resource used for performing uplink transmission; the third resource configuration information includes activation information or deactivation information used for setting availability of the physical layer radio resource used for performing uplink transmission;

correspondingly, the resource acquiring module is specifically configured to determine the physical layer radio resource used for performing uplink transmission according to the fourth resource configuration information, and activate or deactivate the physical layer radio resource used for performing uplink transmission according to the third resource configuration information; if the physical layer radio resource used for performing uplink transmission is activated, then acquire physical layer radio resource used for performing uplink transmission.

Further, the user equipment of the above embodiment further includes:

a second sending module, configured to send a time information report to the network side according to uplink data to be sent, to enable the network side to determine to generate the third resource configuration information according to the time information report.

Further, in the user equipment of the above embodiment, the third resource configuration information includes: an SR resource period, a subframe in the SR resource period allocated for the user equipment, and a physical uplink control channel PUCCH resource for bearing the SR; and/or includes: an SRS resource period, a subframe in the SRS resource period allocated for the user equipment, and an SRS channel resource for bearing the SRS; and/or includes: a CQI resource period, a subframe in the CQI resource period allocated for the user equipment, and a PUCCH resource for bearing the CQI.

Further, the user equipment in the above embodiment further includes:

a resource releasing module, configured to release the physical layer radio resource used for performing uplink transmission, if it is determined that a preset condition is satisfied.

Further, in the user equipment of the above embodiment, the third resource configuration information further includes a valid period or a number of valid times of the physical layer radio resource used for performing uplink transmission;

correspondingly, the resource releasing module is specifically configured to release the physical layer radio resource used for performing uplink transmission, if it is determined that a TAT expires, or the valid period or the number of valid times is exceeded.

Further, in the user equipment of the above embodiment, the resource acquiring module is further configured to deactivate the physical layer radio resource used for performing uplink transmission, if the TAT expires.

Further, in the user equipment of the above embodiment, the third resource configuration information is resource configuration information generated by the network side according to a preset range of physical layer radio resources, where each physical layer radio resource within the preset range has a unique identification code, which is less than or equal to the quantity of the resources of a corresponding resource type in the preset range of the physical layer radio resources;

correspondingly, the resource acquiring module is specifically configured to parse out the identification code carried in the MAC PDU or the PDCCH signaling, and determine the physical layer radio resource used for performing uplink transmission according to the identification code carried in the MAC PDU or the PDCCH signaling.

Embodiment 9

The embodiment provides a communication system, including a network device in Embodiment 7 and a user equipment in Embodiment 8.

The specific procedure for the communication system to perform resource configuration in this embodiment is the same with the method for configuring resources in the foregoing embodiments, and thus is not repeated here any further.

In the communication system according to this embodiment, the eNB carries the resource configuration information in the MAC PDU or the PDCCH signaling after configuring the resource and generating resource configuration information for the UE, and sends the MAC PDU or the PDCCH signaling to the UE, so that the UE can acquire the physical layer radio resource used for performing uplink transmission by processing the MAC PDU or the PDCCH signaling. Since the eNB and the UE can complete the MAC PDU or the PDCCH signaling processing using the MAC layer and the physical layer, or only using the physical layer, there is no need to occupy and therefore, signaling consumption is low, processing efficiency is high and delay is short, and the configuration efficiency for the physical layer radio resource is improved greatly.

Persons skilled in the art may appreciate that, all or partial steps of the above method embodiments can be implemented by a program instructing related hardware. The program can be stored in a computer readable medium. When the program is executed, the steps in the above method embodiments are performed; the storage medium includes various media capable of storing program codes, such as ROM, RAM, a floppy disk, or an optical disk and the like.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for configuring uplink pilot signal resources, comprising:
   generating uplink pilot signal resource configuration information, wherein the uplink pilot signal resource configuration information comprises first resource configuration information and second resource configuration information;
   sending the first resource configuration information to a user equipment in advance through a radio resource control protocol (RRC) message; and
   carrying the second resource configuration information in a physical downlink control channel (PDCCH) signaling and sending the PDCCH signaling to the user equipment;
   wherein, the uplink pilot signal resource configuration information is configured to enable the user equipment to perform uplink pilot signal transmission according to the uplink pilot signal resource configuration information; and
   wherein the first resource configuration information comprises parameter information related to the physical layer radio resource used for the user equipment to perform uplink pilot signal transmission; the second resource configuration information comprises activation information or deactivation information for setting availability of the physical layer radio resource uses for the user equipment to perform uplink pilot signal transmission; and the first resource configuration information comprises a valid period or a number of valid times of the uplink pilot signal resource.

2. The method for configuring resources according to claim 1, wherein, the first resource configuration information further comprises an uplink pilot signal resource period, a subframe in the uplink pilot signal resource period allocated for the user equipment, and an uplink pilot signal channel resource for bearing the uplink pilot signal.

3. The method for configuring resources according to claim 1, wherein, the performing uplink pilot signal transmission according to the uplink pilot signal resource configuration information comprises:
   determining the physical layer radio resource used for performing uplink pilot signal transmission according to the first resource configuration information, and activating or deactivating the physical layer radio resource used for performing uplink pilot signal transmission according to the second resource configuration information; if the physical layer radio resource used for performing uplink pilot signal transmission is activated, then the physical layer radio resource is available for performing uplink pilot signal transmission; if the physical layer radio resource used for performing uplink pilot signal transmission is deactivated, stopping using the physical layer radio resource to perform uplink pilot signal transmission.

4. The method for configuring resources according to claim 1, wherein before the generating uplink pilot signal resource configuration information, further comprising:
   receiving a time information report sent by the user equipment; and
   determining to generate the resource configuration information according to the time information report.

5. A method for configuring uplink pilot signal resources, comprising:
   acquiring fourth resource configuration information by receiving and parsing a radio resource control protocol (RRC) message sent by a network side;
   receiving a physical downlink control channel (PDCCH) signaling sent by the network side, wherein the PDCCH signaling carries third resource configuration information;
   parsing the PDCCH signaling to acquire the third resource configuration information, and
   acquiring a physical layer radio resource used for performing uplink pilot signal transmission according to the third resource configuration information and the fourth resource configuration information;
   wherein the fourth resource configuration information comprises parameter information related to the physical cal layer radio resource used for performing uplink pilot signal transmission; the third resource configuration information comprises activation information or deactivation information for setting availability of the physical layer radio resource used for performing uplink pilot signal transmission; and the fourth resource configuration information comprises a valid period or a number of valid times of the uplink pilot signal resource.

6. The method for configuring resources according to claim 5,
   wherein, the acquiring the physical layer radio resource used for performing uplink pilot signal transmission according to the fourth resource configuration information and the third resource configuration information comprises:

determining the physical layer radio resource used for performing uplink pilot signal transmission according to the fourth resource configuration information, and activating or deactivating the physical layer radio resource used for performing uplink transmission according to the third resource configuration information; if the physical layer radio resource used for performing uplink transmission is activated, then the physical layer radio resource is available for performing uplink pilot signal transmission; if the physical layer radio resource used for performing uplink transmission is deactivated, stopping using the physical layer radio resource used to perform pilot signal transmission.

7. The method for configuring resources according to claim 6, wherein, the fourth resource configuration information further comprises: an uplink pilot signal resource period, a subframe in the uplink pilot signal resource period allocated for the user equipment, and an uplink pilot signal channel resource for bearing the uplink pilot signal.

8. The method for configuring resources according to claim 5, before the acquiring the fourth resource configuration information by receiving and parsing the radio RRC message sent by the network side, further comprising:
sending a time information report to the network side according to uplink data to be sent, to enable the network side to determine to generate the third resource configuration information according to the time information report.

9. The method for configuring resources according to claim 5, further comprising:
releasing the physical layer radio resource used for performing uplink transmission, when it is determined that the valid period or the number of valid times is exceeded.

10. A network device, comprising a resource configuring module and a first sending module coupled to each other, wherein:
the resource configuring module is configured to generate uplink pilot signal resource configuration information, and provide it to the first sending module; wherein the resource configuration information comprises first resource configuration information and second resource configuration information;
the first sending module is configured to send the first resource configuration information to a user equipment in advance through an RRC message; and carry the second resource configuration information in the PDCCH signaling and send to the user equipment, the first resource configuration information and the second resource configuration information are configured to enable the user equipment to perform uplink pilot signal transmission according to the first resource configuration information and the second resource configuration information; and
the first resource configuration information comprises parameter information related to the physical layer radio resource used for the user equipment to perform uplink pilot signal transmission; the second resource configuration information comprises activation information or deactivation information for setting availability of the physical layer radio resource used for the user equipment to perform pilot signal uplink transmission; and the first resource configuration information comprises a valid period or a number of valid times of the uplink pilot signal resource.

11. The network device according to claim 10, wherein, the first resource configuration information further comprises an uplink pilot signal resource period, a subframe in the uplink pilot signal resource period allocated for the user equipment, and an uplink pilot signal channel resource for bearing the uplink pilot signal.

12. The network device according to claim 10, wherein, the performing uplink pilot signal transmission according to the uplink pilot signal resource configuration information comprises:
determining the physical layer radio resource used for performing uplink pilot signal transmission according to the first resource configuration information, and activating or deactivating the physical layer radio resource used for performing uplink pilot signal transmission according to the second resource configuration information; if the physical layer radio resource used for performing uplink pilot signal transmission is activated, then the physical layer radio resource is available for performing uplink pilot signal transmission; if the physical layer radio resource used for performing uplink transmission is deactivated, stopping using the physical layer radio resource to perform pilot signal transmission.

13. A user equipment, comprising a second receiving module and a resource acquiring module coupled to each other, wherein:
the second receiving module is configured to receive a PDCCH signaling sent by a network side, and provide the PDCCH signaling to the resource acquiring module, wherein the PDCCH signaling carries third resource configuration information;
the second receiving module is configured to acquire fourth resource configuration information by receiving and parsing an RRC message sent by the network side;
the resource acquiring module is configured to parse the PDCCH signaling to acquire the third resource configuration information, and acquire a physical layer radio resource used for performing uplink pilot signal transmission according to the fourth resource configuration information and the third resource configuration information; and
the fourth resource configuration information comprises parameter information related to the physical layer radio resource used for performing uplink pilot signal transmission; the third resource configuration information comprises activation information or deactivation information for setting availability of the physical layer radio resource used for performing uplink pilot signal transmission; and the fourth resource configuration information comprises a valid period or a number of valid times of the uplink pilot signal resource.

14. The user equipment according to claim 13, wherein, the resource acquiring module is specifically configured to determine the physical layer radio resource used for performing uplink pilot signal transmission according to the fourth resource configuration information, and activate or deactivate the physical layer radio resource used for performing uplink pilot signal transmission according to the third resource configuration information; if the physical layer radio resource used for performing uplink pilot signal transmission is activated, then acquire the physical layer radio resource used for performing uplink transmission; if the physical layer radio resource used for performing uplink transmission is deactivated, then stop using the physical layer radio resource used for performing uplink pilot signal transmission.

15. The user equipment according to claim 14, wherein, the fourth resource configuration information further comprises an uplink pilot signal resource period, a subframe in the uplink pilot signal resource period allocated for the user equipment, and an uplink pilot signal channel resource for bearing the uplink pilot signal.

16. A communication system, comprising a user equipment and a network device, wherein,
the network device is configured to generate uplink pilot signal resource configuration information, wherein the uplink pilot signal resource configuration information comprises first resource configuration information and second resource configuration information; send the first resource configuration information to the user equipment in advance through a radio resource control protocol (RRC) message; carry the second resource configuration information in a physical downlink control channel (PDCCH) signaling and send the PDCCH signaling to the user equipment; wherein the first resource configuration information comprises parameter information related to the physical layer radio resource used for the user equipment to perform uplink pilot signal transmission; the second resource configuration information comprises activation information or deactivation information for setting availability of the physical layer radio resource uses for the user equipment to perform uplink pilot signal transmission, and the first resource configuration information comprises a valid period or a number of valid times of the uplink pilot signal resource; and the user equipment is configured to acquire the first resource configuration information and the second resource configuration information, and acquire a physical layer radio resource used for performing uplink pilot signal transmission according to the first resource configuration information and the second resource configuration information.

17. The communication system according to claim 16, wherein, the first resource configuration information further comprises an uplink pilot signal resource period, a subframe in the uplink pilot signal resource period allocated for the user equipment, and an uplink pilot signal channel resource for bearing the uplink pilot signal.

18. The communication system according to claim 16, wherein, the performing uplink pilot signal transmission according to the uplink pilot signal resource configuration information comprises:
determining the physical layer radio resource used for performing uplink pilot signal transmission according to the first resource configuration information, and activating or deactivating the physical layer radio resource used for performing uplink pilot signal transmission according to the second resource configuration information; if the physical layer radio resource used for performing uplink pilot signal transmission is activated, then the physical layer radio resource is available for performing uplink pilot signal transmission; if the physical layer radio resource used for performing uplink pilot signal transmission is deactivated, stopping using the physical layer radio resource to perform uplink pilot signal transmission.

* * * * *